Sept. 6, 1932.  H. R. GOTTHARDT ET AL  1,875,375
CONVEYER GATE SECTION
Filed Aug. 9, 1930   2 Sheets-Sheet 1

Inventor
HENRY R. GOTTHARDT
WILLIAM E. CAIN
By C. L. Parker
Attorney

Patented Sept. 6, 1932

1,875,375

UNITED STATES PATENT OFFICE

HENRY R. GOTTHARDT, OF LOUISVILLE, KENTUCKY, AND WILLIAM E. CAIN, OF JEFFERSONVILLE, INDIANA, ASSIGNORS TO LOGAN CO., INC., OF LOUISVILLE, KENTUCKY, A CORPORATION OF KENTUCKY

CONVEYER GATE SECTION

Application filed August 9, 1930. Serial No. 474,228.

This invention relates to conveyer gate sections.

In connection with conveyer systems, it frequently is necessary to provide a passageway through the conveyer to permit the movement of persons and articles along the floor of the building. Heretofore, this passageway has been provided by mounting a section of the conveyer to swing upwardly about a suitable pivot connection, the gate section thus provided being movable back to operative position whenever desired.

Gate sections of the character referred to ordinarily are provided with gravity rollers to support articles moving between the portions of the conveyer connected by the gate, and the provision of gravity rollers in the gate section is disadvantageous when used with power driven conveyers, such as belt, live roller and similar conveyers. For example, the gate section must be given a certain degree of pitch to properly effect the travel of packages or articles therealong, and the provision of this pitch is frequently objectionable. Furthermore, with the gravity conveyer gate, it is impossible to control the speed and spacing of the articles or packages, and this in many cases is important.

An important object of the present invention is to provide a conveyer gate section having means for positively moving articles therealong.

A further object is to provide a power driven conveyer gate section which is operative for moving articles over the gate section at a speed equal to the movement of articles over the power driven conveyer sections between which the gate section is arranged.

A further object is to provide a gate section which is operative through a separate source of power or through the power delivered to one of the adjacent sections and which is movable to open or inoperative position without affecting the power means employed.

Other objects and advantages of the invention will become apparent during the course of the following description.

In the drawings we have shown one embodiment of the invention. In this showing,

Figure 1:
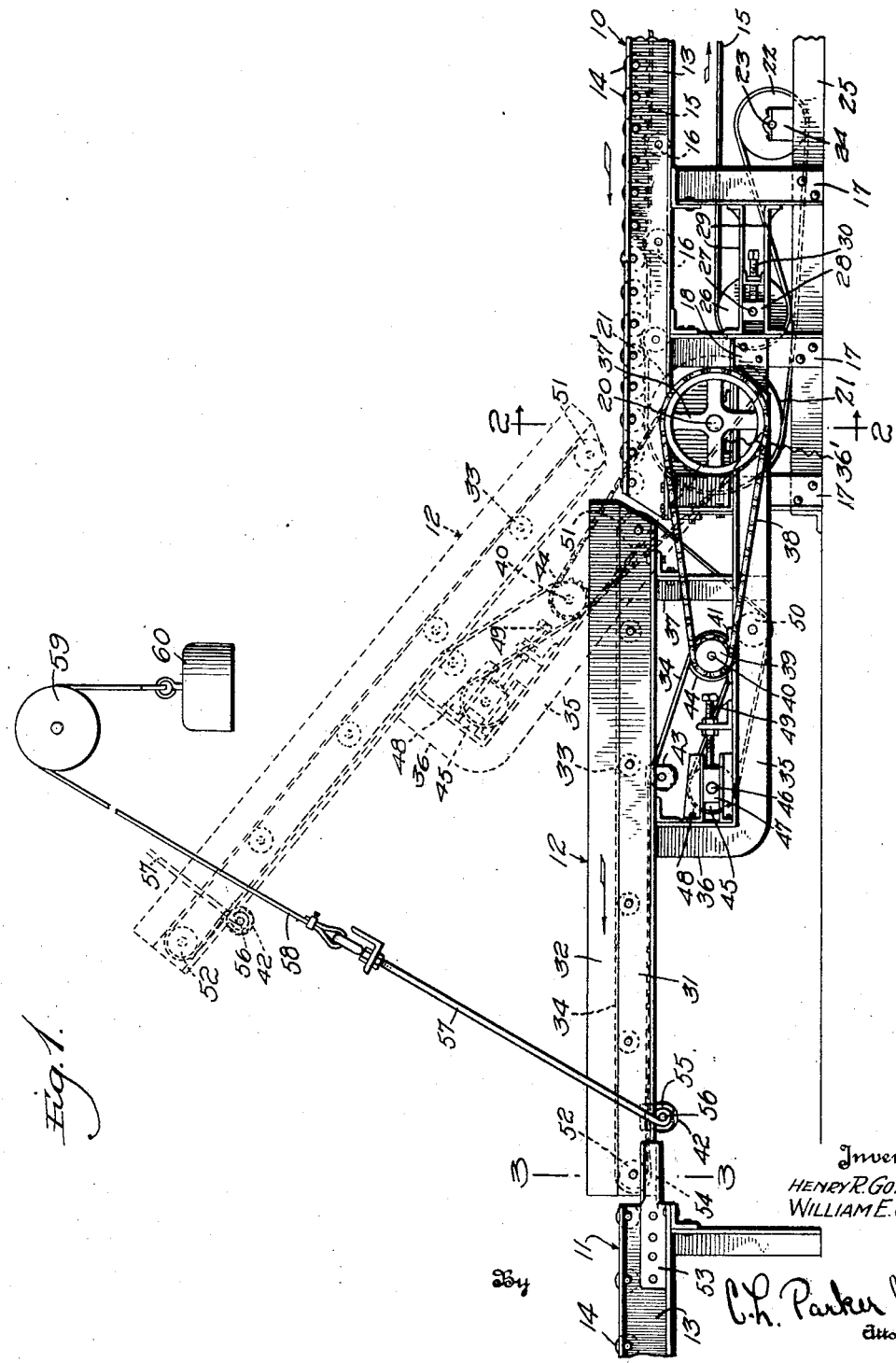
Figure 1 is a side elevation.

Referring to the drawings, the numerals 10 and 11 designate a pair of power conveyer sections which are normally connected to form a continuous conveyer by a gate section indicated as a whole by the numeral 12. In the present instance, each conveyer section 10 and 11 has been illustrated as being of the live roller type, but it will become apparent that the invention is applicable to power driven conveyers of various types.

Each of the conveyers 10 and 11 includes parallel side rails 13 between which are supported live rollers 14. The bottoms of the rollers contact with a belt 15 to be driven thereby, and this belt at intervals passes over idler rollers 16 to maintain the belt in driving engagement with the rollers 14.

Figure 2:
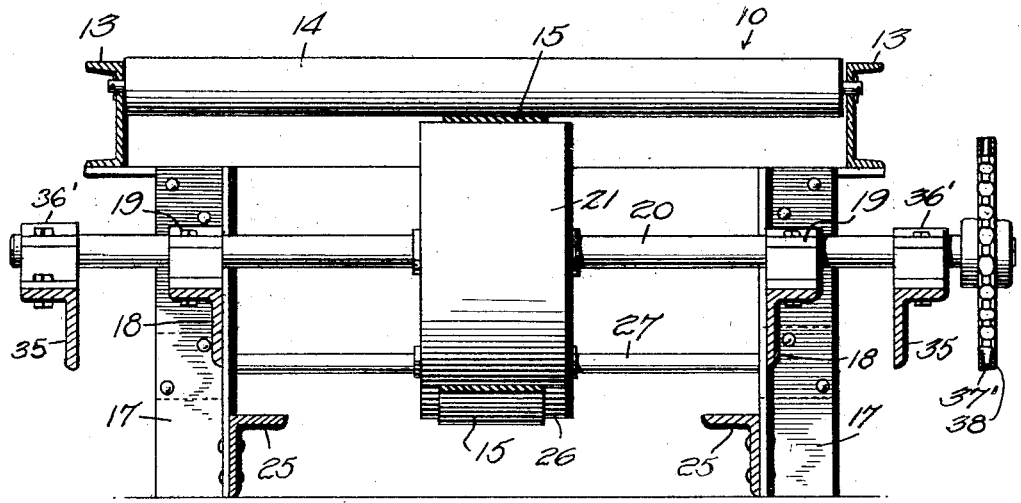
Figure 2 is a vertical transverse section on line 2—2 of Figure 1.

The side rails 13 are mounted on suitable supports 17, as shown in Figure 1, and the two pairs of posts or supports 17 adjacent the end of the conveyer section 10 are connected together by transverse supports 18. Each support 18 carries a bearing 19 in which is mounted a transverse shaft 20, as clearly shown in Figure 2. A pulley 21 is mounted on the shaft 20 centrally of the conveyer, and the belt 15 passes around the pulley. An idler pulley 22 is mounted on a shaft 23 supported in bearings 24 carried by rails 25 connected between the various posts 17.

Take-up means is provided for the belt 15 in the form of a pulley 26 mounted upon a shaft 27. This shaft is rotatable in a bearing 28 slidable in guides 29, and a take-up screw 30 is adapted to move the pulley 26 to tension the belt 15. It will be apparent that power may be delivered at any point in the system for positively driving the belt 15, and the movement of the belt in the manner described obviously drives the pulley 21 and shaft 20.

Figure 3:
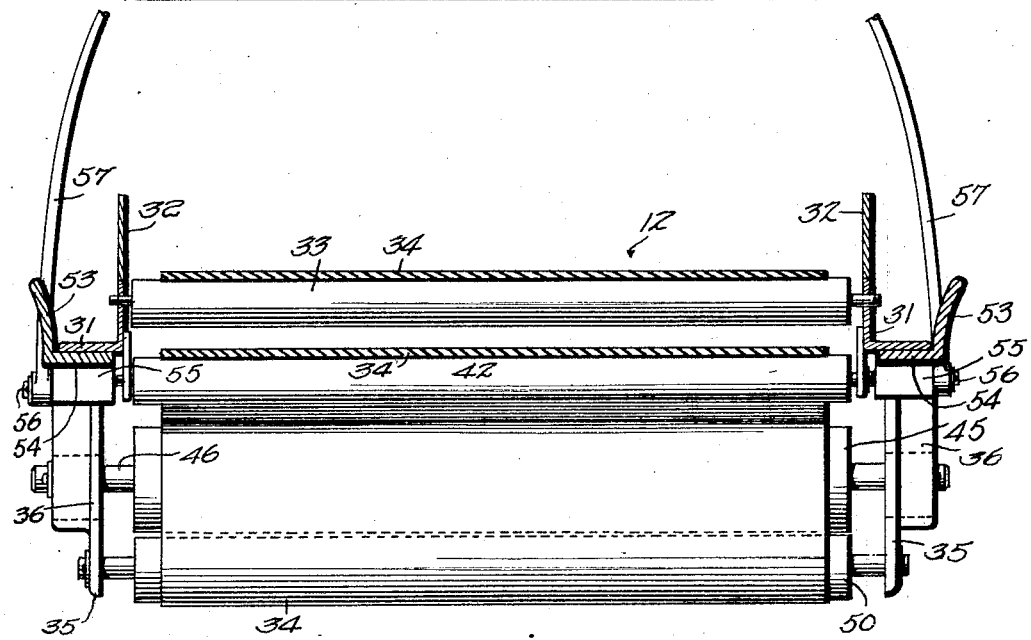
Figure 3 is a similar view on line 3—3 of Figure 1.

The gate section 12 includes parallel side rails 31 having guides 32 extending upwardly therefrom. Rollers 33 are journalled between the side rails 31, as shown in Figures 1 and 3, and a belt 34 passes over the rollers 33. While the gate section has been illustrated in the form of a belt conveyer, it will become apparent that any form of power conveyer means may be employed.

A pair of horizontal supports 35 is arranged beneath the gate section, each support 35 being arranged beneath one of the rails 31 and having one end turned upwardly as at 36 and secured to the corresponding rail. At a point spaced from their last named ends, the supports 35 are connected by vertical posts 37 to side rails 31, and accordingly a rigid connection is provided between the rails 31 and supports 35.

The supports 35 have their free ends extending past the adjacent pair of posts 17, and each support 35 carries a bearing 36′ rotatably receiving opposite end portions of the shaft 20. This construction provides a pivotal connection for supporting the gate section to permit it to swing upwardly to and beyond the dotted line position shown in Figure 1. The shaft 20 not only serves as means for pivotally supporting the gate section but also as means for driving the conveyer elements associated with the gate section, and for this purpose a sprocket 37′ is carried by the shaft 20.

A chain 38 passes around the sprocket 37′ and around a smaller sprocket 39 mounted upon a shaft 40 supported by bearings 41, these bearings being mounted upon the supports 35. The lower run of the belt 34 passes over idler rollers 42 and 43, as shown in Figure 1, and from the latter roller, the belt passes around a drive pulley 44 mounted upon the shaft 40.

From the pulley 44, the belt 34 passes around a take-up pulley 45 mounted upon a shaft 46 journalled in a bearing 47. The bearing 47 is slidable in guides 48 and a take-up screw 49 is adapted to move the bearing 47 and pulley 45 to tension the belt 34. From the pulley 45, the belt passes downwardly around an idler roller 50 journalled between the supports 35. Relatively large rollers or pulleys 51 and 52 are arranged between the ends of the rails 31. After passing around the pulley 50, the belt passes upwardly around the pulley 51, and at the opposite end of the gate section the belt passes around the roller or pulley 52. Any suitable means may be provided to act as a stop for limiting the downward movement of the gate section, and for accurately guiding it to operative position when it starts downwardly. For example, plates 53 may be secured to the side rails 13 of the conveyer section 11, as shown in Figures 1 and 3. These plates are provided beneath the free end of the gate section with horizontal flanges 54 engageable beneath and supporting the rails 31. The upper edges of the plates 53 are preferably flared outwardly as shown in Figure 3 to accurately guide the free end of the gate section in its downward movement as it approaches operative position.

A bracket 55 is secured to each rail 31 adjacent the free end thereof and is provided with an outstanding stub 56. The lower ends of the arms of a yoke 57 are connected to the stubs 56, while the upper end of the yoke is connected to a cable 58 passing upwardly and inwardly around a pulley 59. The other end of the cable 58 carries a counter-weight 60 to substantially balance the weight of the gate sections to permit the latter to be easily moved.

The operation of the apparatus is as follows:

The gate section normally occupies the position illustrated in Figure 1, and the conveying means associated therewith forms a continuation of the conveying means of the sections 10 and 11. Articles on the conveyer section 10 will move in the direction of the arrow illustrated in Figure 1, the top run of the belt 15 moving in the opposite direction as it frictionally engages the bottoms of the rollers 14. From the conveyer section 10 the articles or packages pass to the gate section 12 and will be supported upon and moved by the upper run of the belt 34 toward the free end of the gate section. Articles discharged from the gate section move to the conveyer section 11 to travel upon the rollers 14 which are driven in the same manner as the rollers 14 of the conveyer section 10.

The shaft 20 drives the sprocket 37′ to transmit power to the conveying means of the gate section, and the relative sizes of the sprockets 37′ and 39 are such as to drive the belt 34 at the same linear speed as the belt 15. The belt 34 will be driven by the pulley 44 and will be caused to travel in the path previously described, the upper run of the belt over the tops of the rollers 33 traveling in the direction of the arrow shown in Figure 1. Since the upper run of the belt 34 travels at the same linear speed as the belt 15, the rate of movement of articles through the conveyer will be uniform. Accordingly it will be apparent that the speed and spacing of the packages may be perfectly controlled.

The gate section readily may be swung upwardly to inoperative position when it is desired to provide a passageway transversely through the conveyer. This may be done merely by manually swinging the gate section upwardly, manual operation being facilitated by the provision of the counter-weight 60. Since the gate section is pivoted upon the shaft 20, the gate section may be swung upwardly without disturbing the chain 38 or associated elements, since the sprocket 37′ is concentric with the swinging axis of the gate section. Accordingly the present construction provides positive means for moving articles on a conveyer gate section without the necessity of providing pitch, as is necessary with gravity conveyers, and the gate section very readily may be swung to operative and inoperative positions. Obviously the plates 53 serve to guide the free end of the gate as it approaches operative position, while the bottom flanges 54 of the plates 53 serve as supporting means for the free end of the gate section.

It is to be understood that the form of our invention herewith shown and described is to be taken as a preferred example of the same and that various changes in the shape, size and arrangement of parts may be resorted to without departing from the spirit of our invention or the scope of the subjoined claims.

We claim:

1. Apparatus of the character described comprising a pair of main conveyer sections having their adjacent ends spaced from each other, a conveyer gate section normally horizontally arranged between said main conveyer sections and forming a continuation thereof, a shaft pivotally supporting one end of said gate section, stop means for limiting the downward movement of the free end of said gate section to normal position, power conveying means for one of said main conveying sections and including an endless member, a rotatable member concentric with said shaft and over which said endless member passes, power conveying means for said gate section, and driving connections between said rotatable member and said last named conveying means.

2. Apparatus of the character described comprising a pair of main conveyer sections having their adjacent ends spaced from each other, a conveyer gate section normally horizontally arranged between said main conveyer sections and forming a continuation thereof, a shaft pivotally supporting one end of said gate section, stop means for limiting the downward movement of the free end of said gate section to normal position, power conveying means for each of said main conveying sections, one of said conveying means including a belt, a pulley fixed to said shaft to rotate therewith, power conveying means for said gate section including a belt and a pulley in operative engagement therewith, a sprocket connected to said last named pulley, a sprocket connected to said shaft, and a chain passing around said pulleys.

3. Apparatus of the character described comprising a pair of main conveyer sections having their adjacent ends spaced from each other, a conveyer gate section normally horizontally arranged between said main conveyer sections and forming a continuation thereof, a shaft pivotally supporting one end of said gate section, stop means for limiting the downward movement of the free end of said gate section to normal position, load supporting rollers carried by said main sections, belt means engageable against the bottoms of said rollers to effect rotation thereof, a pulley fixed to said shaft and around which said belt means passes, power conveying means for said gate section including an endless belt, a pulley around which said endless belt passes, a sprocket connected to said last named pulley, a sprocket fixed to said shaft, and a chain passing around said sprockets.

4. Apparatus of the character described comprising a pair of main conveyer sections having their adjacent ends spaced from each other, a conveyer gate section normally horizontally arranged between said main conveyer sections and forming a continuation thereof, each of said main sections including side rails and a supporting framework therefor, load supporting rollers journalled in said side rails, a drive belt engaging said rollers, a shaft rotatably supported by the framework of one of said main sections, a pulley mounted upon said shaft and around which the belt of said last named main section passes, said gate section including rollers and an endless belt in engagement therewith, a frame rigidly connected to said gate section and including a pair of arms extending beyond the adjacent end of said last named main section, a bearing carried by each of said arms and rotatably receiving said shaft, a driving member secured to said shaft, a driving member operatively connected to the belt of said gate section, and an endless driving connection between said driving members.

5. Apparatus of the character described comprising a conveyer section, a normally horizontal conveyer gate forming a continuation of and having one end arranged adjacent said conveyer section, a shaft pivotally supporting said end of said gate, means for limiting the downward movement of the free end of said gate to normal position, power driven conveying means for said conveying section including an endless member and a rotatable member fixed to said shaft to rotate therewith, power driven conveying means for said gate including an endless member and a rotatable member around which such endless member passes, a pair of rotatable members connected respectively to said last named rotatable member and to said shaft, and an endless driving member passing around the rotatable members of said pair.

6. Apparatus of the character described comprising a conveyer section, a conveyer gate forming a continuation of and having one end arranged adjacent said conveyer section, arms carried by said gate at opposite sides thereof and having ends projecting beyond the adjacent end of said conveyer section, a shaft pivotally supporting said ends of said arms, stop means for limiting the downward movement of the free end of said gate to normal position, separate conveying means for said conveyer section and said gate each including load supporting means, a rotatable driving member, and endless driving means therefor, the rotatable driving member of said conveyer section being concentric with said shaft, and power transmitting means connecting said rotatable driving members.

7. Apparatus of the character described comprising a conveyer section, a conveyer gate forming a continuation of and having one end arranged adjacent said conveyer section, a shaft pivotally supporting said end of said gate section, stop means for limiting the downward movement of the free end of said gate section to normal position, load supporting rollers carried by said conveyer section, endless driving means for said rollers, a rotatable driving member arranged concentric with said shaft and around which said endless driving means passes, power conveying means for said gate including an endless member and a rotatable member around which such endless member passes, a rotatable member connected to said last named rotatable member, and an endless driving member passing around said first and last named rotatable members.

8. Apparatus of the character described comprising a main conveyer section, a conveyer gate forming a continuation of and having one end arranged adjacent said conveyer section, supporting means for said last named end of said gate comprising a pair of arms carried by the gate and having their ends arranged outwardly of and projecting beyond the adjacent end of said conveyer section, a shaft supporting the ends of said arms, conveying means carried by said conveyer section and said gate, a rotatable drive member mounted concentric with said shaft, and connections between said rotatable drive member and the conveying means of said gate.

In testimony whereof we affix our signatures.

HENRY R. GOTTHARDT.
WILLIAM E. CAIN.